US011416132B2

(12) United States Patent
Sun et al.

(10) Patent No.: US 11,416,132 B2
(45) Date of Patent: Aug. 16, 2022

(54) SCALING DISPLAY CONTENTS BASED ON USER-TO-SCREEN DISTANCE

(71) Applicant: VMware, Inc., Palo Alto, CA (US)

(72) Inventors: Yue Sun, Beijing (CN); Bo Liu, Beijing (CN); Ming Zhao, Beijing (CN); Jingxiao Xu, Beijing (CN); Yanni Wu, Beijing (CN); Xiang Hu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/944,701

(22) Filed: Jul. 31, 2020

(65) Prior Publication Data
US 2022/0011927 A1    Jan. 13, 2022

Related U.S. Application Data

(63) Continuation of application No. PCT/CN2020/101305, filed on Jul. 10, 2020.

(51) Int. Cl.
*G06F 3/04845* (2022.01)
*G06T 3/40* (2006.01)
*G06F 3/01* (2006.01)
*H04L 67/131* (2022.01)
*H04R 3/04* (2006.01)
*G06F 9/451* (2018.01)

(52) U.S. Cl.
CPC .......... *G06F 3/04845* (2013.01); *G06F 3/013* (2013.01); *G06F 3/017* (2013.01); *G06F 9/452* (2018.02); *G06T 3/40* (2013.01); *H04L 67/38* (2013.01); *H04R 3/04* (2013.01); *G06F 2203/04806* (2013.01); *H04R 2430/01* (2013.01)

(58) Field of Classification Search
CPC ...... G06F 3/04845; G06F 9/452; G06F 3/013; G06F 3/017; G06F 2203/04806; G06T 3/40; H04L 67/38; H04R 3/04; H04R 2430/01
USPC ......................................................... 715/764
See application file for complete search history.

(56) References Cited

U.S. PATENT DOCUMENTS

| | | | | |
|---|---|---|---|---|
| 10,310,715 | B2* | 6/2019 | Chak | G06F 3/0485 |
| 11,144,099 | B1* | 10/2021 | Silber | G06F 3/04845 |
| 2011/0119640 | A1* | 5/2011 | Berkes | G06F 3/017 |
| | | | | 715/863 |
| 2014/0132499 | A1* | 5/2014 | Schwesinger | G06T 7/73 |
| | | | | 345/156 |
| 2015/0103003 | A1* | 4/2015 | Kerr | G06F 3/0488 |
| | | | | 345/158 |
| 2018/0095528 | A1* | 4/2018 | Tao | G06K 9/00369 |
| 2018/0268608 | A1* | 9/2018 | Schneider | G06F 3/04815 |
| 2018/0268609 | A1* | 9/2018 | Schneider | G06F 3/04815 |
| 2019/0121522 | A1* | 4/2019 | Davis | G06F 3/04815 |
| 2019/0199935 | A1* | 6/2019 | Danielsen | G06K 9/00221 |
| 2019/0304060 | A1* | 10/2019 | Sial | G06T 11/60 |

(Continued)

*Primary Examiner* — William D Titcomb

(57) ABSTRACT

A system is described for scaling display content on a computing device based on user-to-device distance. A measurement is taken of the distance between the user and the device and a scaling setting is determined using a predefined rule based on the measured distance. The scaling setting is applied to scale content on the display based on the user-to-device distance by changing settings in the operating system or changing scaling in an application. Embodiments include virtual desktop/application and localized implementations.

20 Claims, 6 Drawing Sheets

(56) References Cited

U.S. PATENT DOCUMENTS

| | | | |
|---|---|---|---|
| 2020/0090396 A1* | 3/2020 | Holmes | G06T 1/20 |
| 2020/0252413 A1* | 8/2020 | Buzbee | G06F 21/6245 |
| 2020/0394056 A1* | 12/2020 | Midgley | G06F 9/45504 |
| 2020/0410769 A1* | 12/2020 | Lee | G06T 19/006 |
| 2021/0118410 A1* | 4/2021 | Grieves | G06F 3/04842 |
| 2021/0312107 A1* | 10/2021 | Koutsomanis | G06F 9/5027 |
| 2021/0358079 A1* | 11/2021 | Komanduru, V | G06T 3/40 |

* cited by examiner

SCALING DISPLAY CONTENTS BASED ON USER-TO-SCREEN DISTANCE

CLAIM OF PRIORITY

This application is a continuation of International Application PCT/CN2020/101305, entitled "SCALING DISPLAY CONTENTS BASED ON USER-TO-SCREEN DISTANCE", by Yue Sun et al., with an international filing date of Jul. 10, 2020, which is incorporated by reference herein in its entirety.

TECHNICAL FIELD

The present disclosure generally relates to optimizing computing device displays, and more specifically to scaling the size of display contents based on the distance between a user and the display.

BACKGROUND

Computing devices such as desktop computers, laptops, tablets, smartphones, etc. normally include ways for users to manually control the scaling of contents displayed on the screen. Often, a user can adjust the size of elements on the screen or the resolution by making adjustments in system settings, such as settings in the operating system, which allow the user to select how big or small contents on the display appear.

For example, a user who prefers to place the screen farther from herself or himself may adjust the system to produce larger elements on the display so that text and other contents are more easily discerned from the farther distance. Conversely, a user who prefers to place the screen closer to herself or himself may adjust the system to produce smaller elements so that text and other contents remain comfortably within the user's field of view at the closer distance.

However, such display adjustments typically require a user to access system settings and are not convenient to change. Even when an application provides a more convenient feature to "zoom-in" or "zoom-out", the extra steps necessary to make the manual adjustments can be a distraction to a user's workflow. Particularly in cases where the user-to-screen distance changes often, whether for the user's comfort (e.g., to relieve eye stress) or due to other factors, manual adjustment of display scaling can be a significant inconvenience.

A more efficient approach is desirable for controlling the scaling of display contents on computing devices.

DETAILED DESCRIPTION

Systems and methods in accordance with various embodiments of the present disclosure overcome at least some of the above-mentioned shortcomings and deficiencies by providing more efficient ways to control the scaling of display contents on computing devices based on the distance between the user and the screen. In particular, embodiments described herein leverage a mechanism for measuring or estimating the distance between a user or the user's eyes and the screen and adjusting the scaling of display contents based on the measured distance. As a result, the size of on-screen content can be optimized for the user based on the user-to-screen distance automatically and without interruption to the user.

In this architecture, a device such as an eye tracker, camera, or any other device capable of measuring the user's proximity can be used to measure or estimate the distance between the user's eyes and the display of a computing device such as a desktop or a laptop computer, tablet, smartphone, etc. The computing device can then adjust the scaling of display contents based on the measured distance. The measurements can be taken continuously or at periodic intervals so that scaling is adjusted on an ongoing basis as the user gets closer to or farther from the screen. In various embodiments, the scaling can be adjusted by changing scaling or resolution settings in the operating system (OS) of the computing device. In various embodiments, audio volume on the computing device can also be adjusted based on the user distance.

In an embodiment, the system can be implemented with virtual desktops or virtual applications, where the user's application(s) run on a guest operating system in a virtual machine hosted on a server to provide the virtual desktop or virtual application to the user. The user can interact with the virtual desktop or virtual application via a client running on the user's computing device, whereby the graphical user interface (GUI) of the virtual desktop/application is streamed to and displayed by the client, and the user's inputs are received at the client and conveyed to the virtual desktop/application to be effectuated therein.

In such virtual desktop or virtual application implementations, the distance measurement can be taken between the user and the display of the user device on which the client is running. The measurements can be conveyed to the virtual desktop/application on the server and the scaling of content in the GUI being sent to the client can be adjusted based on the received distance measurements. For example, GUI scaling can be adjusted by changing display settings in the guest operating system on which the virtual desktop/application is running. This way, as the user moves farther from or closer to the screen of the client device, the scaling of the virtual desktop/application GUI on the display can be adjusted based on the user-to-screen distance.

Figure 1:
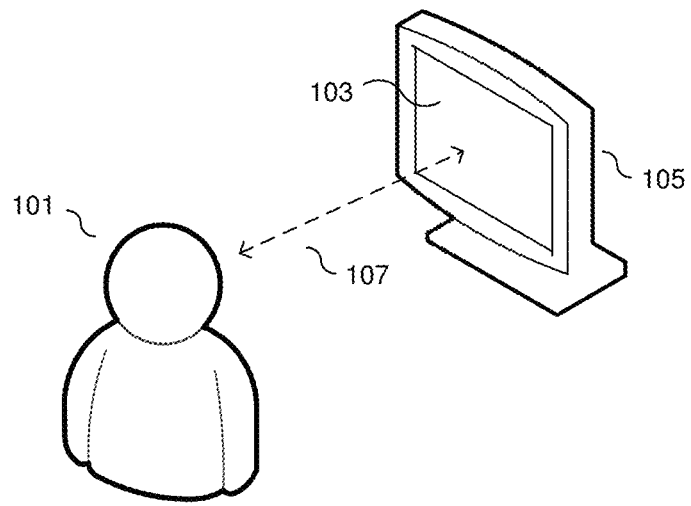
FIG. 1 illustrates an example system for scaling display contents based on user-to-screen distance, in accordance with various embodiments.

FIG. 1 illustrates an example system for scaling display contents based on user-to-screen distance, in accordance with various embodiments. As illustrated in the example of FIG. 1, a user 101 is looking at a screen 103 of a computing device 105. In this example, the computing device 105 is a desktop computer; however, in various embodiments the computing device 105 can be a laptop computer, a tablet, smartphone, or any other type of applicable computing device.

In various embodiments, the distance 107 between the user 101 and the screen 103 (indicated by the broken arrow) can be measured or estimated using a variety of devices. For example, the device can be an eye tracker, such as the eye tracking device available from Tobii AB. Such eye tracking devices can have the ability to track where the user is looking on the screen, as well as the distance 107 between the user's 101 eyes and the screen 103. Eye trackers can work using a device that is placed on the user 101, such as a pair of glasses that the user 101 wears.

In other embodiments, a camera can be used to measure or estimate the distance 107. For example, the camera can be integrated into the computing device 105, or the camera can be an external camera that is connected to the computing device 105. The camera can use various methods and algorithms to estimate how far the user 101 or the user's 101 eyes are from the screen 103.

For example, a camera positioned in front of the user and pointed at the user's face (e.g., a camera integrated into the display or the display bezel) can capture images of the user and analyze the images to estimate the distance 107 using various techniques. One such technique can be based on a reference dimension, e.g., the distance between the user's 101 eyes, which may be measured in pixels of the image. The reference dimension (e.g., eye-to-eye distance) can be captured by the camera when the user is located at a reference user-to-screen distance (e.g., during a calibration step) and stored. As the user moves away from the screen, the dimension (e.g., distance between the eyes) in captured images will decrease, and vice versa. Because the eye-to-eye distance is predictably correlated with the user-to-screen distance, an algorithm can be used to estimate the user-to-screen distance in a captured image based on the user-to-screen distance in the reference image by comparing the eye-to-eye distance in the captured image with the reference eye-to-eye distance. Even in a case where the user-to-screen distance in the reference image is not known, such a technique can be used to estimate the difference in the user-to-screen distance between a captured image and the reference image (the "delta"). This delta can then be used by the system to determine at which point and by how much to change scaling.

In various embodiments, the measured distance 107 can be to any part of the user (e.g., head, face, shoulder, chest, hand, etc.) or to an object located somewhere on the user. In various embodiments, if a measurement is taken to a location on the user other than the eyes, the screen-to-eye distance can be approximated by adding/subtracting a predetermined amount to/from the measured distance to compensate for the difference in distance to the user's 101 eyes.

Other devices and methods not explicitly mentioned herein may also be used to measure and estimate the distance 107 between the user 101 and the screen 103 and the invention is not limited to any particular approach.

In various embodiments, the distance 107 can be measured continuously or periodically at predetermined intervals and the scaling of screen 103 contents can be adjusted based on the distance 107. In an embodiment, scaling can be adjusted by changing display settings in the operating system (OS) that make items such as text, applications, and other on-screen elements larger or smaller. In previous technologies, such settings may have been adjustable manually by the user. In various embodiments, such scaling settings can be adjusted automatically by the system based on the user-to-screen distance 107.

Various operating systems can have adjustable settings for display scaling. For example, versions of the Windows operating system, available from Microsoft Corporation, allow an adjustment range of scaling size by percentage (e.g., 100% to 500%) that changes the size of on-screen items. In various embodiments, scaling can be adjusted based on the user to screen distance 107 by changing this setting, as will be described in more detail below. Operating systems can also allow adjustments of other settings resulting in changes of on-screen element size, such as display resolution (e.g., 3840×2160, 2560×1920, 1920×1080, etc.), dots-per-inch (DPI), etc. In various embodiments, any such settings can be changed by the system to adjust scaling based on the user-to-screen distance 107. In various embodiments, any other settings, whether in the operating system or otherwise, producing changes in the size of on-screen items can likewise be used by the system to adjust the scaling of on-screen content.

In various embodiments, the changes to scaling do not necessarily need to take place in the OS. For example, the scaling can be done in an application. In this case, for example, the distance data can be conveyed to the application and the application can adjust the size of contents in the application user interface based on the distance.

The example system of FIG. 1 can likewise be implemented in the virtual desktop/application setting. In this case, the computing device 105 could be a client device on which a client application runs and communicates with the remotely executing desktop/application (not illustrated). The GUI of the remote desktop/application can be streamed to the client and displayed on the screen 103 in a window of the client, while user inputs are conveyed by the client to the remote desktop/application. In this case, the distance 107 measurements can be conveyed to the remote server and changes to display scaling can be implemented based on the distance 107 in the guest operating system running remotely on the server where the desktop/application executes. As a result, the scaling of contents in the client window (i.e., the GUI) on the screen 103 can be adjusted based on the distance 107.

As will be apparent to those skilled in the art, different approaches not limited to the ones described herein can be implemented to change and adjust the size of on screen elements on computer device screens and the invention is not limited to any particular way of changing display scaling. As used herein, references to increasing or higher scaling refer to increasing the size of on-screen elements or zooming-in, and references to decreasing or lower scaling refer to reducing the size of on-screen elements or "zooming-out", irrespective of how the scaling change is implemented.

Various rules can be implemented for adjusting scaling based on the user to screen distance 107. In various embodiments, the system can be configured to increase scaling as the distance 107 increases, so that content is enlarged and remains visible as the user moves away from the screen 103, and to decrease scaling as the distance 107 decreases, so that content size is reduced and is comfortable to view as the user moves closer to the screen 103. In other embodiments, the system can be configured to do the opposite, that is, to increase scaling as the user gets closer and decrease scaling as the user moves away.

In an embodiment, scaling can be adjusted continuously as the distance 107 changes. For example, scaling can be increased/decreased constantly as the distance 107 increases/decreases, respectively. Or, scaling can be decreased/increased constantly as the distance 107 increases/decreases, respectively. In various embodiments, the system can store a graph or a table that specifies what scaling to use for different distances 107. The system can also calculate scaling based on the distance 107 using an algorithm that calculates scaling based on the distance 107. The relationship between scaling and distance can be linear, inverse linear, exponential, or follow any other type of curve or relationship.

In an embodiment, scaling can be adjusted based on a pre-determine or pre-set key distance value representing a threshold for changing scaling. For example, a key distance value (e.g., 50 cm) can be designated and, when the distance 107 is lower than the key distance value, one scaling setting can be used (e.g., 200%). When the distance is higher than the key distance value, a different scaling setting can be used (e.g., 300%). The scaling setting can be set so that scaling is higher at the farther range as in this example (so that elements are larger at the bigger distance 107), or they can be set in the opposite way so that scaling is smaller at the farther range.

In an embodiment, the change can be triggered as soon as the distance 107 passes the key distance value (either going from above the key value to below it, or the other way). In other embodiments, to reduce the likelihood of the scaling changing back and forth repeatedly and thereby becoming an inconvenience to the user 101, a threshold can be introduced (e.g., 10 cm) so that the distance 107 has to pass the key value by the threshold amount before a scaling change is triggered. For example, in this case, when the distance 107 changes from below the key value (e.g., 50 cm) to above the key value, the scaling change would be triggered at a distance equal to the key value plus the threshold. Hence, if the threshold is 10 cm, then it would be triggered at 60 cm. Conversely, when the distance 107 changes from above the key value (e.g., 50 cm) to below the key value, the scaling change would be triggered at a distance equal to the key value minus the threshold. Hence, if the threshold is 10 cm, then it would be triggered at 40 cm.

In various embodiments, the system can be configured to work with multiple distance ranges (e.g., two or more ranges) and a different scaling setting can be used in each range. In this case, a different scaling setting can be applied for scaling display content when the distance 107 falls in each of the different distance ranges. For example, the ranges can be Range 1: 0 cm-50 cm; Range 2: 50 cm-100 cm; and Range 3: 100 cm-infinity. A different scaling setting can be assigned to each range (e.g., the scaling can increase with each farther range or in some embodiments it can decrease). For example, scaling in Range 1 can be 100%, scaling in Range 2 can be 150%, and scaling in Range 3 can be 200%. To determine what scaling setting to use for a given distance 107, the system can first determine which range the distance falls into and retrieve the scaling setting assigned to that range. Accordingly, whenever the distance 107 is in a given range, the scaling setting assigned to that range can be applied for scaling the display content. Once the distance moves to a different range, the scaling setting assigned to the different range can be applied. As with key values above, a threshold can be introduced between each range so that a scaling change is only triggered once the distance 107 has moved into a different range by the threshold amount.

In an embodiment, the system can be configured to trigger a scaling change when the cumulative change in the distance 107 reaches a threshold value. In this case, the system can continuously detect and record user distance 107 changes. When the continuous unidirectional change reaches a preset delta value, scaling changes can be triggered. This may be preferable, for example, in cases where the device (e.g., due to hardware constraints) is able to measure changes in distance 107 but cannot derive an absolute value for the distance 107. In this case, the system can keep track of the change in distance 107 relative to a standard position. Then, when the change (or delta) reaches a certain threshold amount of distance (whether getting closer to the screen or farther), a change in scaling can be triggered (e.g., increasing scaling when the user gets farther than the threshold distance and decreasing scaling when the user gets closer than the threshold distance). In an embodiment, the user can manually set the standard position from which the system calculates the delta. In another embodiment, the system can determine the standard position automatically, such as by determining via learning algorithms what is the most common position for the user.

In an embodiment, scaling can also be adjusted based on the speed with which the user 101 moves towards or away from the screen 107. The speed can be measured based on the rate at which the distance 107 changes. For example, when the system detects that the user 101 is moving towards the screen faster than a certain threshold speed, the system can trigger a scaling operation (e.g., to increase or decrease scaling). Similarly, when the system detects that the user 101 is moving away from the screen faster than a certain threshold speed, the system can trigger another scaling operation (e.g., to decrease or increase scaling).

In various embodiments, a scaling setting can provide an absolute value of a parameter (e.g., a scaling size percentage value, a specific resolution value, a specific DPI value). In other embodiments, a scaling setting can be an instruction to change a certain parameter that controls scaling by a certain amount (e.g., to change scaling size percentage by a certain amount, to change resolution by a certain amount, to change DPI by a certain amount, etc.).

In various embodiments, the scaling settings indicated by rules as describes above can be set in reference to a baseline scaling. Namely, the user 101 may adjust the scaling at a certain distance per the user's preference. The system can then treat this scaling setting as the baseline setting for the distance at which the user 101 is positioned when she sets the baseline scaling. The system can then determine what scaling settings to use at other distances in relation to the baseline setting. For example, in a system implementing three distance ranges, if the user 101 sets a baseline display scaling when the user is located in Range 2, then that baseline scaling will be implemented whenever the distance 107 is within Range 2. Based on the baseline scaling, the system can then determine what scaling to use in Ranges 1 and 3. For example, the system can be configured to set Range 1 at a predetermined amount (e.g., 50%) below Range 2, and Range 3 a predetermined amount (e.g., 60%) above Range 2. Similarly, when the rule for calculating scaling implements an algorithm, key values, etc., the scaling settings can be calculated in relation to the baseline level. When volume is automatically adjusted based on distance 107 (as described below), the volume settings can be determined in relation to a baseline volume set by the user as well.

In various embodiments, audio volume of the computing device 105 can be adjusted based on the distance 107. The computing device 105 can comprise one or more audio speakers, which may be integrated or external, and the volume of sound driven to the speakers can be adjusted (i.e., increased or decreased) based on the distance 107. For example, as the distance 107 gets bigger, the volume can be increased, and vice versa. In an embodiment, the system can be configured in the opposite way, so that the volume is increased as the distance 107 decreases. Generally, the same rules for adjusting display scaling based on distance 107 described above can be implemented for adjusting volume. For example, volume can be adjusted continuously as distance 107 changes, based on key distance values where one volume setting is used below the key distance value and another volume setting is used above the key distance value, based on ranges where a pre-defined volume setting is used in each range, based on threshold unidirectional distance change, etc.

Figure 2:
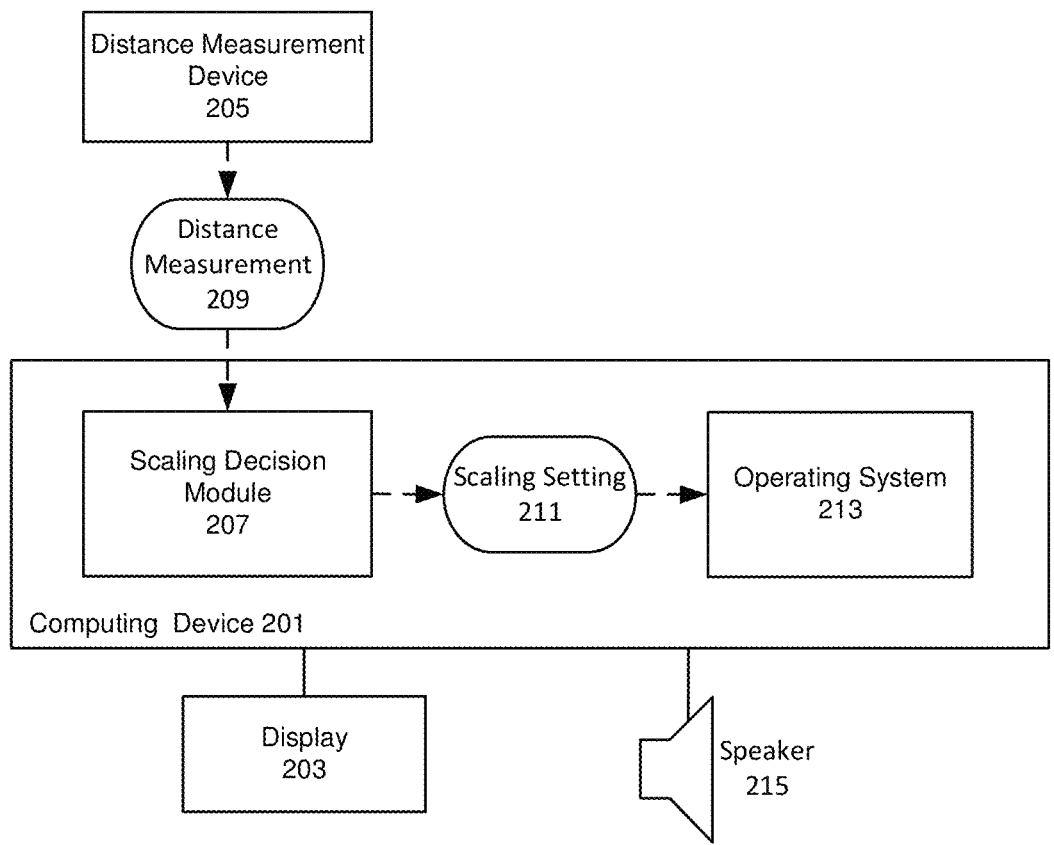
FIG. 2 illustrates an example architecture of a system for scaling display contents based on user-to-screen distance, in accordance with various embodiments.

FIG. 2 illustrates an example architecture of a system for scaling display contents based on user-to-screen distance, in accordance with various embodiments. As illustrated in the example of FIG. 2, a computing device 201 is connected to a display 203. The display 203 can be integrated into the computing device 201, or it can be an external display. The system further includes a distance measurement device 205 that is communicatively linked to the computing device 201 for measuring the distance between the computing device 201 or the display 203 and the user. As described above, the distance measurement device 205 can be an eye-tracker, a camera, or any other device capable of measuring or estimating this distance.

The system further includes a scaling decision module 207, which can determine what scaling setting to use based on user distance. The scaling decision module 207 can implement a variety of rules, such as the rules described above, for determining what scaling settings to use based on user distance. As mentioned, the rules can be based on distance ranges, key distance values, algorithms, cumulative distance change, etc.

In various embodiments, the distance measurement device 205 can measure the user to computing device 201 distance and convey a distance measurement 209 to the scaling decision module 207 in the computing device 201. The scaling decision module 207 can apply a rule to determine a scaling setting 211 based on the distance measurement 209. The scaling decision module 207 can convey the determined scaling setting 211 to an operating system 213 on the client device 201 and the scaling setting 211 can be applied in the operating system's 213 display settings to adjust display scaling. As described above, the scaling setting 211 can provide a value for various display properties in the operating system 213 that affect the size of on-screen elements, such as resolution, DPI, scaling size percentage, etc. Once the scaling setting 211 is applied in the operating system 213, the content in the display 203 can be displayed with the new scaling per the provided scaling setting 211.

In an embodiment, instead of applying the scaling in the operating system 213, the system can set scaling in an application. In one embodiment, the scaling setting 211 can be conveyed from the scaling module 207 to the application instead of the operating system 213, and the scaling setting can be applied in the application to make contents in the application user interface (UI) bigger or smaller. For example, the scaling setting in such a case may be an instruction to set zoom at a certain value or to increase/decrease zoom in the application user interface. In an embodiment, the scaling decision module 207 can be integrated into the application itself (i.e., the application itself can implement the scaling rules described above). In this case, the distance measurement 209 can be conveyed directly to the application and the application can apply a scaling rule as described above to adjust the scaling of its UI based on the distance measurement 209.

The example system of FIG. 2 further includes a speaker 215 for producing sound on the computing device 201. The speaker 215 can be integrated into the computing device 201 or it can be an external speaker. In various embodiments, audio volume that is driven to the speaker 215 on the computing device 201 can be adjusted (i.e., increased or decreased) based on the distance measurement 209. The same approaches described herein for scaling display content can be applied to adjusting volume based on user distance. For example, the scaling decision module 207 can implement the same types of rules as with display scaling (based on ranges, key values, algorithms, etc.) to determine a volume setting based on user to computing device distance (or user to speaker distance). The determined volume setting can then be conveyed to the operating system 213 to change system volume on the computing device 201, or the determined volume setting can be conveyed to an application on the computing device 201 to change volume in the application.

As discussed previously, the system can be implemented in the virtual desktop or virtual application environment. As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional virtual desktop infrastructure (VDI) or desktop as a service (DAAS) environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

With virtual applications, instead of providing a user with a full desktop session, i.e., where the user gets to see and interact with the entire desktop, the user can be given access to a single particular application on the desktop, so that he or she is able to see and interact with the application and not with other parts of the virtual desktop, which can be hidden from the user. This approach is preferable, for example, when an enterprise wishes to deliver access to a particular application to users, without giving access to the remainder of the computing environment where the application runs. This type of session is referred to as a "virtual application", "remote application", or an "application session" throughout this disclosure and these terms may be used interchangeably. Hence, with a virtual application, the application can run inside a remote desktop but look and feel to the user on his or her client device as if only the application is executing. Behind the scenes, however, the application can be running inside a desktop session, but only the application's user interface (UI) may be visible and accessible to the user on the client device. As in a full desktop session, with virtual applications user inputs can be conveyed from the client device to the remote desktop and redirected to the operating system (OS) of the remote desktop, so that the OS can deliver the inputs to the application, while the GUI of the application is streamed back and displayed on the client device.

Figure 3:
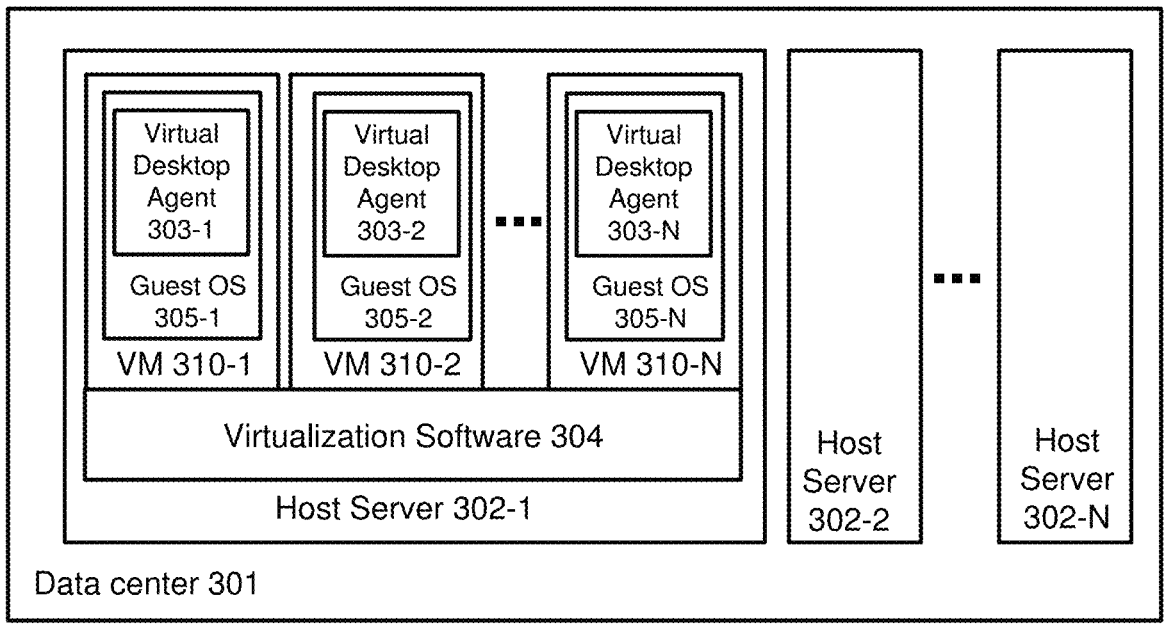
FIG. 3 illustrates an example of a virtual desktop environment, in accordance with various embodiments.
Figure 3:
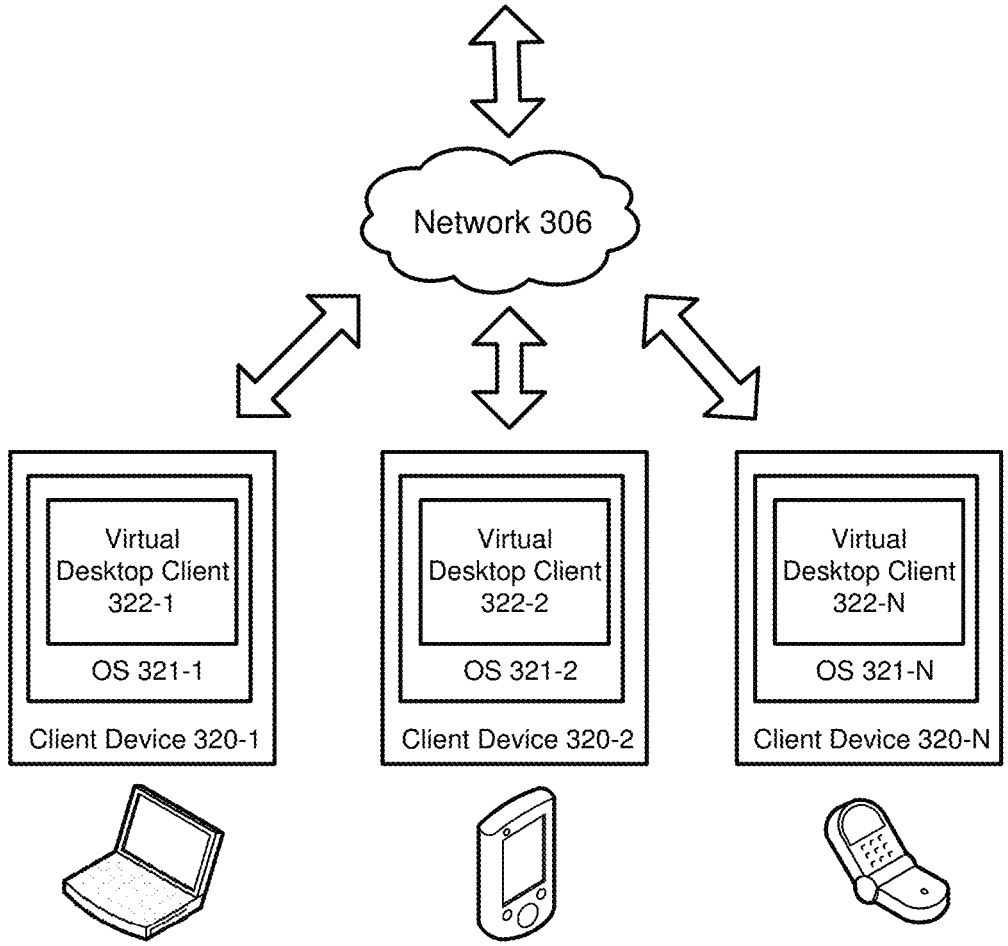

FIG. 3 illustrates an example of a virtual desktop environment, in accordance with various embodiments. The virtual desktop environment, such as VDI or DAAS environment, includes host servers (302-1, 302-2, 302-N) that are communicatively coupled with a number of client devices (320-1, 320-2, 320-N) via a network 306. Network 306 may be a wide area network (WAN), or other form of remote communication link between the host servers (302-1, 302-2, 302-N) and client devices (320-1, 320-2, 320-N). Network 306 may further include numerous other components, such as one or more firewalls, connection brokers, management servers, etc., which are not shown here so as not to obscure salient features of the remote desktop environment. Host servers (302-1, 302-2, 302-N) may physically reside in a data center 301 of the enterprise (e.g., in case of VDI) or in a data center of a third-party service provider (e.g., in case of DAAS).

By way of illustration, host server 302-1 can interoperate with client devices (320-1, 320-2, 320-N) to provide virtual desktop services to users of client devices (320-1, 320-2, 320-N). For example, host server 302-1 can host, for each user, a desktop that is presented by a guest operating system (such as one of the guest operating systems 305-1, 305-2, 305-N) running on a virtual machine (such as one of the virtual machines 310-1, 310-2, 310-N) on host server 302-1. In this context, the terms "desktop", "remote desktop", and "virtual desktop" refer to a computing environment in which a user can launch, interact with, and manage the user's applications, settings, and data. Each client device (320-1, 320-2, 320-N) can allow a user to view on a desktop graphical user interface (on a local display device) his/her desktop that is running remotely on host server 302-1, as well as provide commands for controlling the desktop. In this manner, the users of client devices (e.g., 320-1, 320-2, 320-N) can interact with the desktops hosted on host server 302-1 as if the desktops were executing locally on client devices (320-1, 320-2, 320-N).

In the embodiment of FIG. 3, host server 302-1 includes virtualization software 304 that supports the execution of one or more virtual machines (VMs) (e.g., 310-1, 310-2, 310-N). The virtualization software 304 may be a hypervisor, a virtual machine manager (VMM) or other software that allows multiple virtual machines to share the physical resources of the server. In the illustrated embodiment, each virtual machine (e.g., 310-1, 310-2, 310-N) can execute a guest operating system (e.g., 305-1, 305-2, 305-N) that hosts a desktop for a single user at a time. For example, if five users connect to host server 302-1 for the purpose of initiating remote desktop sessions, the host server 302-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 320-1, 320-2, 320-N) can execute a virtual desktop client (e.g., 322-1, 322-2, 322-N). For example, the virtual desktop client (e.g., 322-1, 322-2, 322-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 322-1, 322-2, 322-N) running in the OS (e.g., 321-1, 321-2, 321-N) on the client device (e.g., 320-1, 320-2, 320-N) which communicates with a server-side virtual desktop agent (e.g., 303-1, 303-2, 303-N) that is running on the guest OS inside the virtual machine (e.g., 310-1, 310-2, 310-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

As mentioned previously, a virtual application session can be considered a virtual desktop session in which user access is restricted to the particular application. In various embodiments, an environment such as the example illustrated in FIG. 3 can be used for deployment of a virtual application. For example, the virtual application can be installed on the guest OS (e.g., 305-1, 305-2, 305-N) of a VM (e.g., 310-1, 310-2, 310-N) and a user of the client device (e.g., 320-1, 320-2, 320-N) can access and interact with the application via the virtual desktop client (e.g., 322-1, 322-2, 322-N) and virtual desktop agent (e.g., 303-1, 303-2, 303-N) in the same way as described above in the context of virtual desktop sessions. However, in the case of the virtual application session, the user can be restricted to interacting with only the application and may be blocked from interacting with or viewing other portions of the virtual desktop. Similar to provision of virtual desktops, user inputs on the client device (e.g., 320-1, 320-2, 320-N) can be routed to the application and the application UI can be streamed to the virtual desktop client (e.g., 322-1, 322-2, 322-N) and presented to the user.

It should be noted that the particular virtual desktop environment illustrated in FIG. 3 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 3, as well as all other figures in this disclosure have been simplified for ease of understanding and are not intended to be exhaustive or limiting to the scope of the invention.

Figure 4:
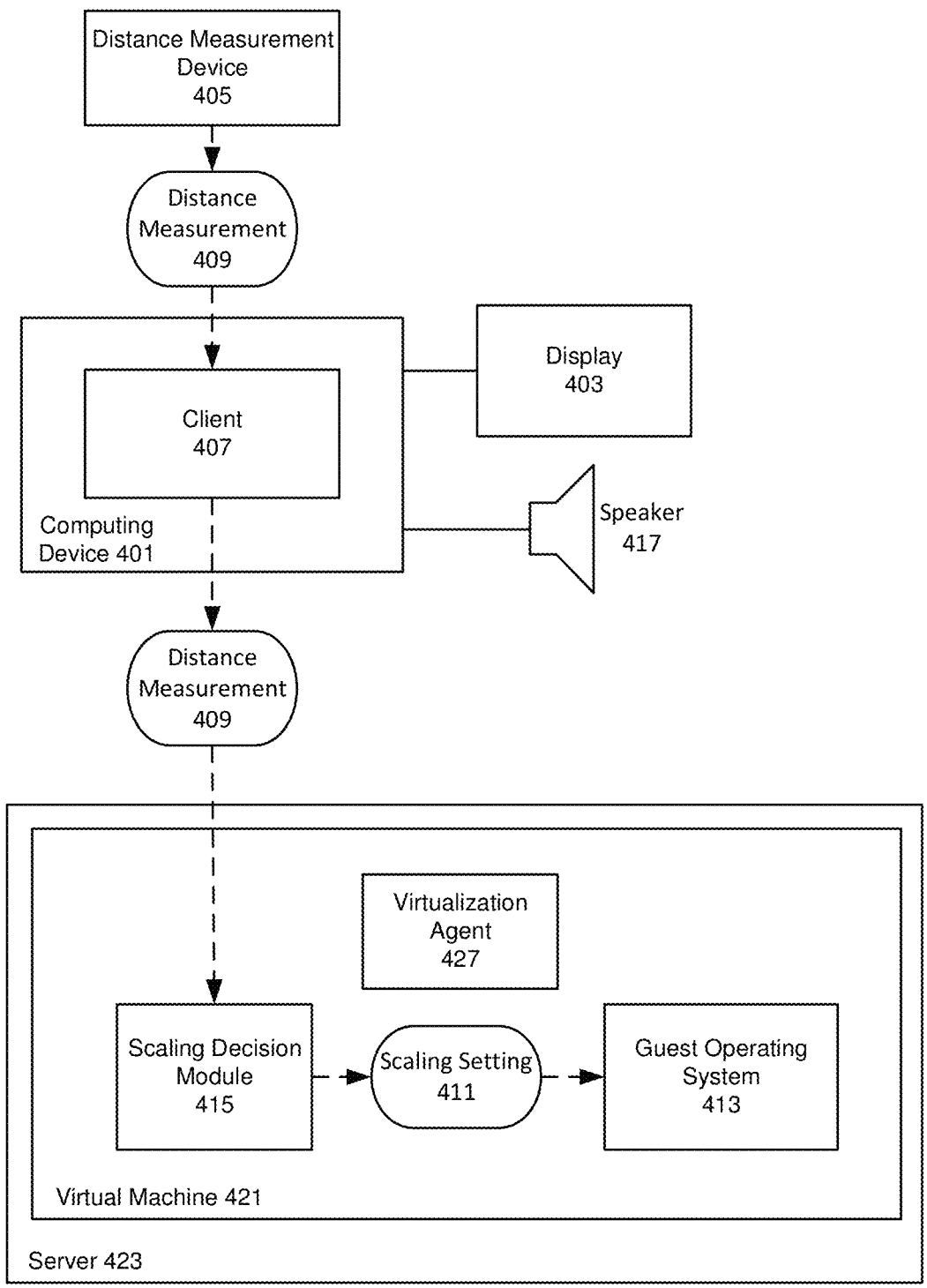
FIG. 4 illustrates an example architecture of a system for scaling display contents based on user-to-screen distance in the virtual desktop or virtual application environment, in accordance with various embodiments.

FIG. 4 illustrates an example architecture of a system for scaling display contents based on user-to-screen distance in the virtual desktop or virtual application environment, in accordance with various embodiments. As illustrated in the example of FIG. 4, a computing device 401 is connected to a display 403. The display 403 can be integrated into the computing device 401, or it can be an external display. A client 407 runs on the computing device 401 to give a user access to a virtual desktop or virtual application provided by a guest operating system 413 that runs in a virtual machine 421 hosted on a remote server 423. The client 407 can be a native client or a web client.

The GUI of the virtual desktop/application can be streamed to and received by the client 407, and be displayed on the display 403 (e.g., in a window of the client). User inputs into the virtual desktop/application can be received at the client 407 and conveyed by the client 407 to the virtual desktop/application running on the server 423. Communication with the virtual desktop/application can take place over a network and be enabled by a virtualization agent 427 running in the virtual machine 421 that communicates with the client 407 to manage interactions such as the conveying of the GUI to the client 407, receiving user inputs from the client 407, and other communications between the computing device 401 and the virtual desktop/application.

The system further includes a distance measurement device 405 that is communicatively linked to the computing device 401 for measuring the distance between the computing device 401 or the display 403 and the user. As described above, the distance measurement device 405 can be an eye-tracker, a camera, or any other device capable of measuring or estimating this distance.

The example system of FIG. 4 further includes a scaling decision module 415 operating in the virtual machine 421, which can determine what scaling setting to use based on user distance. The scaling decision module 415 can implement a variety of rules, such as the rules described above, for determining what scaling settings to use based on user distance. As mentioned, the rules can be based on distance ranges, key distance values, algorithms, cumulative distance change, etc.

In various embodiments, the distance measurement device 405 can convey a distance measurement 409 to the client 407, and the client 407 can in turn convey the distance measurement 409 to the scaling decision module 415 in the virtual machine 421. The scaling decision module 415 can apply a rule to determine a scaling setting 411 based on the distance measurement 409. The scaling decision module 415 can convey the scaling setting 411 to the guest operating system 413. In the guest operating system 413, the scaling setting 411 can be applied to display settings to change the scaling in the GUI being streamed to the client 407. As described above, the scaling setting 411 can provide a value for various display properties in the guest operating system 413 settings that affect the size of on-screen elements, such as resolution, DPI, scaling size percentage, etc. Once the scaling setting 411 is applied in the guest operating system 413, the GUI of the virtual desktop/application with the new scaling per the provided scaling setting 411 can be streamed to the client 407 and displayed on the display 403 (e.g., in a window of the client 407).

In an embodiment, instead of applying the scaling setting 411 in the guest operating system 413, the system can set scaling in an application running on the guest operating system 413. In one embodiment, the scaling setting 411 can be conveyed from the scaling module 415 to the application instead of the operating system 413, and the scaling setting 411 can be applied in the application to change scaling of the UI. For example, the scaling setting in such a case may be an instruction to set zoom at a certain value or to increase/decrease zoom in the application user interface. In an embodiment, the scaling decision module 415 can be integrated into the application itself (i.e., the application itself can implement the scaling rules described above). In this case, the distance measurement 409 can be conveyed directly to the application and the application can apply a scaling rule as described above to adjust the scaling of its UI based on the distance measurement 409.

In an alternative embodiment, the scaling decision module 415 can be located on the computing device 401 (e.g., in or as part of the client 407). In this case, the scaling setting 411 can be determined on the computing device 401 by the scaling decision module based on the distance measurement 409, and the scaling setting 411 can then be conveyed by the client 407 to the virtual desktop/application to be applied in the guest operating system 413 or in an application running on the guest operating system 413.

The example system of FIG. 4 further includes a speaker 417 for producing sound on the computing device 401. The speaker 417 can be integrated into the computing device 401, or it can be an external speaker. Sound information produced by the virtual desktop/application can be conveyed or streamed to the client 407 (e.g., by the agent) and played via the speaker 417. In various embodiments, volume of the audio sent to the computing device 401 from the virtual desktop/application can be adjusted (i.e., increased or decreased) based on the distance measurement 409. The same approaches described herein for scaling display content can be applied to adjusting volume based on user distance. For example, the scaling decision module 415 can implement the same types of rules as with display scaling (based on ranges, key values, algorithms, etc.) to determine a volume setting based on user to computing device distance (or user to speaker distance). The determined volume setting can then be conveyed to the guest operating system 413 to change system volume in the virtual desktop, or the determined volume setting can be conveyed to an application running on the guest operating system 413 to change volume in the application.

Figure 5:
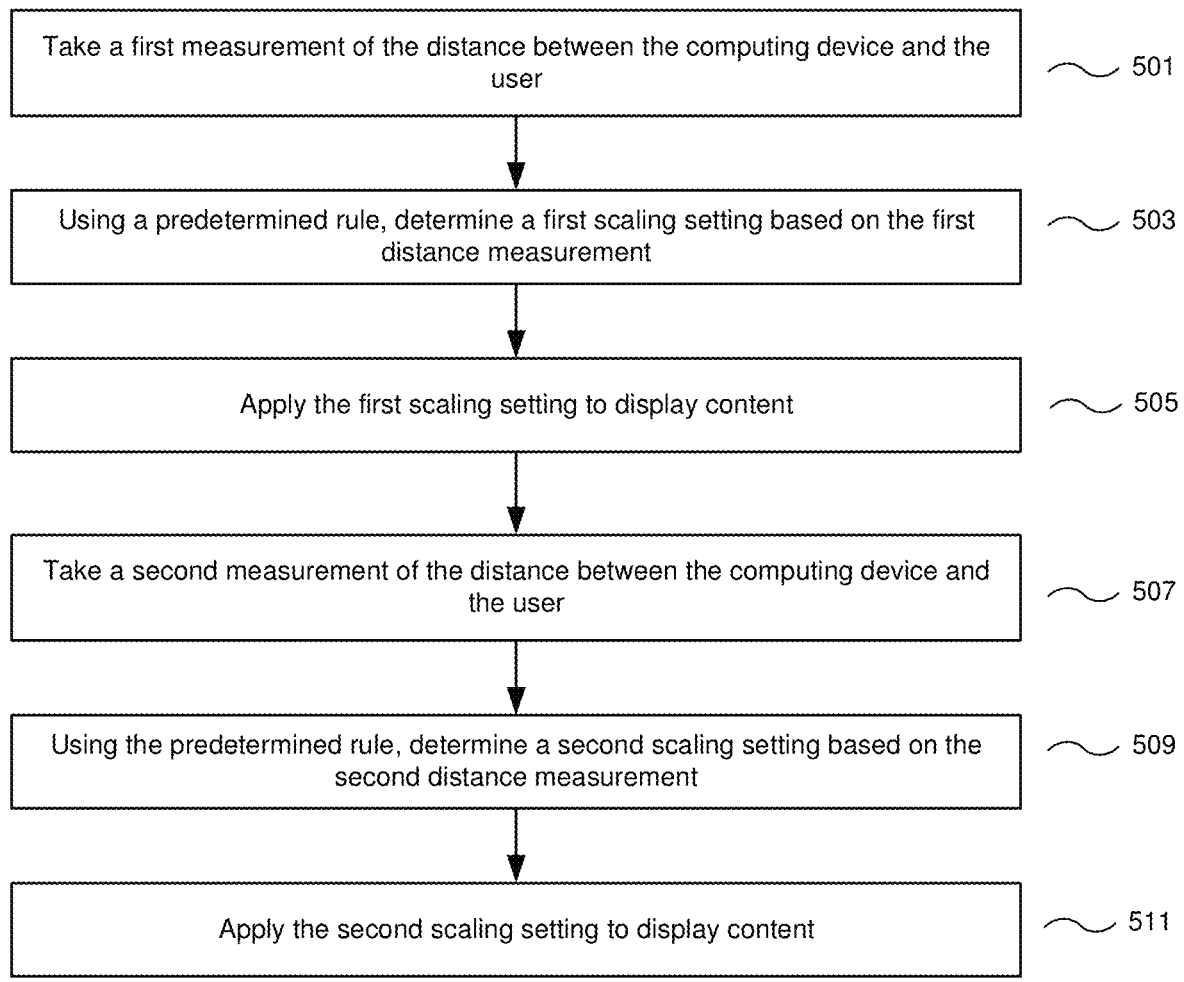
FIG. 5 illustrates an example process flow for scaling display contents based on user-to-screen distance, in accordance with various embodiments.

FIG. 5 illustrates an example process flow for scaling display contents based on user-to-screen distance, in accordance with various embodiments. In operation 501, a first measurement can be taken of the distance between the computing device and the user. In various embodiment, the distance can be measured, for example, between the screen and the eyes of the user. In other embodiments, the measurement can be taken between another point on the computing device and another point on the user.

In operation 503, a predetermined rule can be used to determine a first scaling setting based on the first distance measurement. As described above, the rule can be based on ranges, key values, algorithms, etc. In some virtual desktop/application embodiments, the first distance measurement can be conveyed to the virtual desktop/application and the rule can be applied there to determine a corresponding first scaling setting. The first scaling setting can correspond to display scaling settings in an operating system or to UI scaling in an application.

In operation 505, the first scaling setting can be applied to display content. In localized embodiments, the first scaling setting can be applied in the operating system of the computing device (e.g., in display settings of the OS) or directly in an application. In virtual desktop/application embodiments, the scaling setting can be applied in the guest operating system (e.g., in display settings of the guest OS) or directly in an application running on the guest operating system.

In operation 507, a second measurement can be taken of the distance between the computing device and the user. For example, measurements can be taken at predefined intervals or continuously. In operation 509, the same predetermined rule can be used to determine a second scaling setting based on the second distance measurement. In various embodiments, the system can be configured to proceed to operation 509, i.e., to determine a second scaling setting, only if the system determines that the second distance measurement is different than the first distance measurement. For example, this determination can be made by the scaling decision module. In a further embodiment, the system can be configured to proceed to operation 509 only if the system determines that the second distance measurement is different than the first distance measurement by a predetermined threshold amount. For example, if the threshold amount is 5 cm, then the system may determine to proceed to operation 509 only if the difference between the first measurement and the second measurement is more than 5 cm.

In operation 511, the second scaling setting can be applied to display content. In various embodiments, the system can be configured to proceed to operation 511, i.e., to the apply the second scaling setting to display content, only if the system determines that the second scaling setting is different than the first scaling setting. For example, this determination can be made by the scaling decision module. In a further embodiment, the system can be configured to proceed to operation 511 only if the system determines that the second display setting is different than the first display setting by a predetermined threshold amount.

Figure 6:
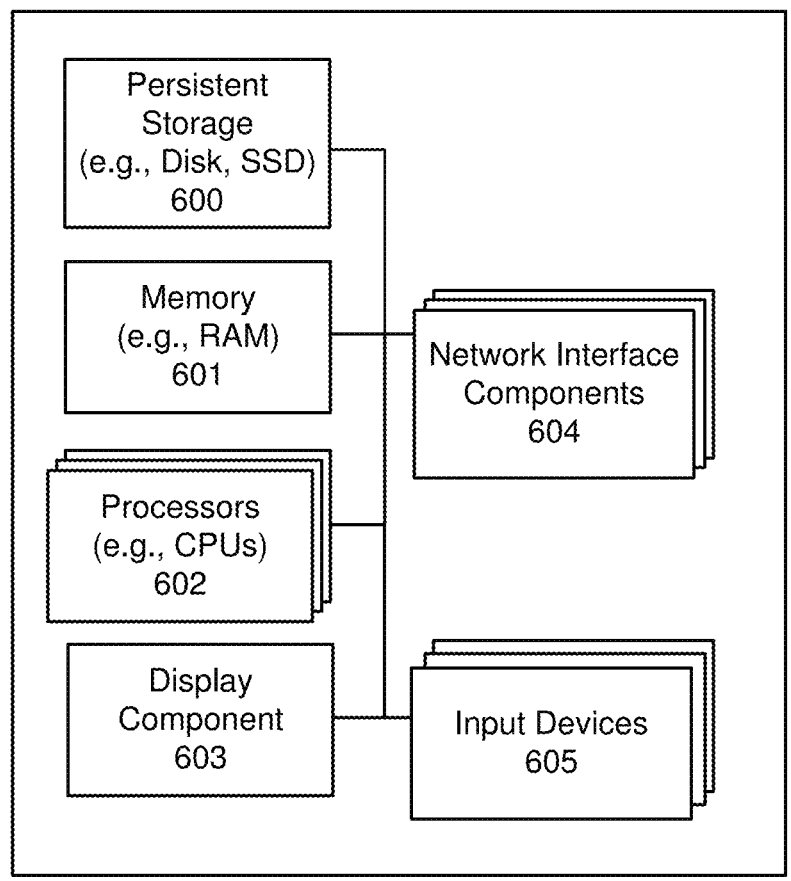
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for scaling contents in a graphical user interface (GUI) of a virtual desktop executing on a server that is streamed to a virtual desktop client running on a user computing device, comprising:
    establishing a virtual desktop session on the virtual desktop by the virtual desktop client running on the user computing device, wherein the virtual desktop is presented by a guest operating system running in a virtual machine on the server and one or more applications executing on the guest operating system, the virtual desktop client being configured to receive user inputs for the virtual desktop on the user computing device and to convey the received user inputs to the server to be effectuated on the virtual desktop, and wherein the virtual desktop client is further configured to display the GUI of the virtual desktop that is streamed to the virtual desktop client to the user on the user computing device;
    by the virtual desktop client on the user computing device, receiving a first measurement of a distance between the user computing device and a user of the user computing device;
    based on a predetermined rule, determining a first scaling setting for the virtual desktop GUI content based on the first measurement;
    in the virtual desktop on the server, applying the first scaling setting to the virtual desktop GUI content and streaming the virtual desktop GUI with the first scaling setting to the virtual desktop client on the user computing device;
    by the virtual desktop client on the user computing device, receiving a second measurement of the distance between the user computing device and the user of the user computing device, the second measurement being different than the first measurement;
    based on the predetermined rule, determining a second scaling setting for the virtual desktop GUI content based on the second measurement, the second scaling setting being different than the first scaling setting; and
    in the virtual desktop on the server, changing the scaling of the virtual desktop GUI content by applying the second scaling setting to the virtual desktop GUI content and streaming the virtual desktop GUI with the second scaling setting to the virtual desktop client on the user computing device.

2. The method of claim 1, wherein the applying the first scaling setting and the second scaling setting to the virtual desktop GUI content comprises changing a display scaling setting in the guest operating system of the virtual machine producing the virtual desktop.

3. The method of claim 1, wherein the taking the first measurement and the second measurement of the distance between the user computing device and the user is performed by one of:
    an eye tracking device; or
    a video camera device.

4. The method of claim 1, wherein the predetermined rule comprises at least one of:
    a key distance value, wherein one scaling setting is indicated for distances below the key distance value and another scaling setting is indicated for distances above the key distance value;
    two or more distance ranges, wherein a different scaling setting is indicated for distances in each of the distance ranges; or
    an algorithm for calculating scaling setting based on distance, in which scaling setting changes continuously with distance.

5. The method of claim 1, wherein the applying the first scaling setting and the second scaling setting to the GUI content in the virtual desktop running on the server further comprises changing scaling in an application user interface of an application running in the virtual desktop.

6. The method of claim 1, wherein audio volume of the user computing device is adjusted based on a distance between the user computing device and the user of the computing device.

7. The method of claim 1, wherein, one of:
    the virtual desktop client sends the first measurement of the distance between the user computing device and the user to the virtual desktop and the first scaling setting for the GUI content is determined in the virtual desktop based on the received first measurement; or
    the virtual desktop client determines the first scaling setting for the GUI content based on the first measurement and sends the determined first scaling setting to the virtual desktop.

8. A computing device for scaling contents in a graphical user interface (GUI) of a virtual desktop executing on a server that is streamed to a virtual desktop client running on a user computing device, comprising:
    at least one processor; and
    memory including instructions that, when executed by the at least one processor, cause the computing device to perform the steps of:
        establishing a virtual desktop session on the virtual desktop by the virtual desktop client running on the user computing device, wherein the virtual desktop is presented by a guest operating system running in a virtual machine on the server and one or more applications executing on the guest operating system, the virtual desktop client being configured to receive user inputs for the virtual desktop on the user computing device and to convey the received user inputs to the server to be effectuated on the virtual desktop, and wherein the virtual desktop client is further configured to display the GUI of the virtual desktop that is streamed to the virtual desktop client to the user on the user computing device;

by the virtual desktop client on the user computing device, receiving a first measurement of a distance between the user computing device and a user of the user computing device;

based on a predetermined rule, determining a first scaling setting for the virtual desktop GUI content based on the first measurement;

in the virtual desktop on the server, applying the first scaling setting to the virtual desktop GUI content and streaming the virtual desktop GUI with the first scaling setting to the virtual desktop client on the user computing device;

by the virtual desktop client on the user computing device, receiving a second measurement of the distance between the user computing device and the user of the user computing device, the second measurement being different than the first measurement;

based on the predetermined rule, determining a second scaling setting for the virtual desktop GUI content based on the second measurement, the second scaling setting being different than the first scaling setting; and in the virtual desktop on the server, changing the scaling of the virtual desktop GUI content by applying the second scaling setting to the virtual desktop GUI content and streaming the virtual desktop GUI with the second scaling setting to the virtual desktop client on the user computing device.

9. The computing device of claim 8, wherein the applying the first scaling setting and the second scaling setting to the virtual desktop GUI content comprises changing a display scaling setting in the guest operating system of the virtual machine producing the virtual desktop.

10. The computing device of claim 8, wherein the taking the first measurement and the second measurement of the distance between the user computing device and the user is performed by one of:
an eye tracking device; or
a video camera device.

11. The computing device of claim 8, wherein the predetermined rule comprises at least one of:
a key distance value, wherein one scaling setting is indicated for distances below the key distance value and another scaling setting is indicated for distances above the key distance value;
two or more distance ranges, wherein a different scaling setting is indicated for distances in each of the distance ranges; or
an algorithm for calculating scaling setting based on distance, in which scaling setting changes continuously with distance.

12. The computing device of claim 8, wherein the applying the first scaling setting and the second scaling setting to the GUI content in the virtual desktop running on the server further comprises changing scaling in an application user interface of an application running in the virtual desktop.

13. The computing device of claim 8, wherein audio volume of the user computing device is adjusted based on a distance between the computing device and the user of the user computing device.

14. The computing device of claim 8, wherein, one of:
the virtual desktop client sends the first measurement of the distance between the user computing device and the user to the virtual desktop and the first scaling setting for the GUI content is determined in the virtual desktop based on the received first measurement; or the virtual desktop client determines the first scaling setting for the GUI content based on the first measurement and sends the determined first scaling setting to the virtual desktop.

15. A non-transitory computer readable storage medium for scaling contents in a graphical user interface (GUI) of a virtual desktop executing on a server that is streamed to a virtual desktop client running on a user computing device, comprising one or more sequences of instructions, the instructions when executed by one or more processors causing the one or more processors to execute the operations of:

establishing a virtual desktop session on the virtual desktop by the virtual desktop client running on the user computing device, wherein the virtual desktop is presented by a guest operating system running in a virtual machine on the server and one or more applications executing on the guest operating system, the virtual desktop client being configured to receive user inputs for the virtual desktop on the user computing device and to convey the received user inputs to the server to be effectuated on the virtual desktop, and wherein the virtual desktop client is further configured to display the GUI of the virtual desktop that is streamed to the virtual desktop client to the user on the user computing device;

by the virtual desktop client on the user computing device, receiving a first measurement of a distance between the user computing device and a user of the user computing device;

based on a predetermined rule, determining a first scaling setting for the virtual desktop GUI content based on the first measurement;

in the virtual desktop on the server, applying the first scaling setting to the virtual desktop GUI content and streaming the virtual desktop GUI with the first scaling setting to the virtual desktop client on the user computing device;

by the virtual desktop client on the user computing device, receiving a second measurement of the distance between the user computing device and the user of the user computing device, the second measurement being different than the first measurement;

based on the predetermined rule, determining a second scaling setting for the virtual desktop GUI content based on the second measurement, the second scaling setting being different than the first scaling setting; and in the virtual desktop on the server, changing the scaling of the virtual desktop GUI content by applying the second scaling setting to the virtual desktop GUI content and streaming the virtual desktop GUI with the second scaling setting to the virtual desktop client on the user computing device.

16. The non-transitory computer readable storage medium of claim 15, wherein the applying the first scaling setting and the second scaling setting to the virtual desktop GUI content comprises changing a display scaling setting in the guest operating system of the virtual machine producing the virtual desktop.

17. The non-transitory computer readable storage medium of claim 15, wherein the taking the first measurement and the second measurement of the distance between the user computing device and the user is performed by one of:
an eye tracking device; or
a video camera device.

18. The non-transitory computer readable storage medium of claim 15, wherein the predetermined rule comprises at least one of:
- a key distance value, wherein one scaling setting is indicated for distances below the key distance value and another scaling setting is indicated for distances above the key distance value;
- two or more distance ranges, wherein a different scaling setting is indicated for distances in each of the distance ranges; or
- an algorithm for calculating scaling setting based on distance, in which scaling setting changes continuously with distance.

19. The non-transitory computer readable storage medium of claim 15, wherein the applying the first scaling setting and the second scaling setting to the GUI content in the virtual desktop running on the server further comprises changing scaling in an application user interface of an application running in the virtual desktop.

20. The non-transitory computer readable storage medium of claim 15, wherein, one of:
- the virtual desktop client sends the first measurement of the distance between the user computing device and the user to the virtual desktop and the first scaling setting for the GUI content is determined in the virtual desktop based on the received first measurement; or
- the virtual desktop client determines the first scaling setting for the GUI content based on the first measurement and sends the determined first scaling setting to the virtual desktop.

* * * * *